(12) United States Patent
Ma et al.

(10) Patent No.: US 11,237,433 B2
(45) Date of Patent: Feb. 1, 2022

(54) TRANSPARENT LIQUID CRYSTAL DISPLAY DEVICE AND DISPLAY METHOD THEREOF

(71) Applicants: Beijing BOE Optoelectronics Technology Co., Ltd., Beijing (CN); BOE Technology Group Co., Ltd., Beijing (CN)

(72) Inventors: Xinli Ma, Beijing (CN); Xiaochuan Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 9 days.

(21) Appl. No.: 16/652,522

(22) PCT Filed: May 9, 2019

(86) PCT No.: PCT/CN2019/086244
§ 371 (c)(1),
(2) Date: Mar. 31, 2020

(87) PCT Pub. No.: WO2019/223545
PCT Pub. Date: Nov. 28, 2019

(65) Prior Publication Data
US 2020/0241363 A1    Jul. 30, 2020

(30) Foreign Application Priority Data

May 21, 2018 (CN) .......................... 201810487662.4

(51) Int. Cl.
*G02F 1/13357* (2006.01)
*G02F 1/1333* (2006.01)
*G02F 1/1335* (2006.01)

(52) U.S. Cl.
CPC .. *G02F 1/133617* (2013.01); *G02F 1/133308* (2013.01); *G02F 1/133514* (2013.01);
(Continued)

(58) Field of Classification Search
CPC ................................................. G02F 1/133617
See application file for complete search history.

(56) References Cited

U.S. PATENT DOCUMENTS

2009/0161035 A1   6/2009   Shao et al.
2011/0141399 A1   6/2011   Kim et al.
(Continued)

FOREIGN PATENT DOCUMENTS

CN    101206330 A    6/2008
CN    102096237 A    6/2011
(Continued)

OTHER PUBLICATIONS

Apr. 8, 2020—(CN) First Office Action Appn 201810487662.4 with English Translation.

*Primary Examiner* — Edmond C Lau
(74) *Attorney, Agent, or Firm* — Banner & Witcoff, Ltd.

(57) ABSTRACT

Embodiments of the present disclosure provides a transparent liquid crystal display device and a display method thereof. The transparent liquid crystal display device includes a transparent liquid crystal display panel and a transparent backlight module, the transparent liquid crystal display panel includes a color filter substrate, the transparent backlight module is disposed on a non-display side of the transparent liquid crystal display panel and includes a transparent light guide plate and an ultraviolet light source, the ultraviolet light source is disposed on a side end of the transparent light guide plate, the color filter substrate includes color resin lasers with different colors, and the color
(Continued)

resin layers with different colors are mixed with fluorescent materials which are excitable to emit corresponding colors.

19 Claims, 1 Drawing Sheet

(52) U.S. Cl.
CPC .. *G02F 1/133528* (2013.01); *G02F 1/133614* (2021.01); *G02F 1/133626* (2021.01); *G02F 2201/501* (2013.01)

(56) References Cited

U.S. PATENT DOCUMENTS

| | | | |
|---|---|---|---|
| 2012/0154711 | A1 | 6/2012 | Park et al. |
| 2014/0036538 | A1* | 2/2014 | You ..................... G09F 13/0409 362/613 |
| 2014/0043565 | A1 | 2/2014 | Ma |
| 2015/0138477 | A1* | 5/2015 | You ................... G02F 1/133512 349/43 |
| 2016/0306215 | A1* | 10/2016 | Chen .................... G02F 1/13362 |
| 2017/0235041 | A1* | 8/2017 | Ninan .................. G02B 6/0068 362/609 |
| 2017/0338429 | A1* | 11/2017 | Watabe ............... H01L 51/5271 |
| 2019/0384110 | A1* | 12/2019 | Tanaka ................ H01L 27/3211 |
| 2020/0241363 | A1 | 7/2020 | Ma et al. |

FOREIGN PATENT DOCUMENTS

| | | |
|---|---|---|
| CN | 102495495 A | 6/2012 |
| CN | 102608796 A | 7/2012 |
| CN | 202472183 U | 10/2012 |
| CN | 103293747 A | 9/2013 |
| CN | 103885237 A | 6/2014 |
| CN | 104423131 A | 3/2015 |
| CN | 104460098 A | 3/2015 |
| CN | 104534357 A | 4/2015 |
| CN | 105242473 A | 1/2016 |
| CN | 105842909 A | 8/2016 |
| CN | 207081916 U | 3/2018 |
| CN | 108535911 A | 9/2018 |

* cited by examiner

TRANSPARENT LIQUID CRYSTAL DISPLAY DEVICE AND DISPLAY METHOD THEREOF

TECHNICAL FIELD

The application is a U.S. National Phase Entry of International Application No. PCT/CN2019/086244 filed on May 9, 2019, designating the United States of America and claiming priority to Chinese Patent Application No. 201810487662.4 filed on May 21, 2018. The present application claims priority to and the benefit of the above-identified applications and the above-identified applications are incorporated by reference herein in their entirety.

BACKGROUND

With the rapid development of display technology, transparent liquid crystal display (LCD) technology has gradually attracted people's attention. The transparent LCD device not only allows users to view the content on a transparent display screen, but also allows the users to view an object behind the transparent display screen, thereby bring new human-computer interaction experience.

The transparent LCD device can display with the help of ambient light, and when the ambient light is weak, the brightness of a display image will correspondingly decrease, so the brightness of the display image needs to be increased.

SUMMARY

At a first aspect, an embodiment of the present disclosure provides a transparent liquid crystal display device, which comprises: a transparent liquid crystal display panel, including a color filter substrate; and a transparent backlight module, disposed on a non-display side of the transparent liquid crystal display panel and including: a transparent light guide plate; and an ultraviolet light source, disposed on a side end of the transparent light guide plate, and the color filter substrate includes color resin layers with different colors, and the color resin layers with different colors are mixed with fluorescent materials which are excitable to emit corresponding colors.

Optionally, in the transparent liquid crystal display device provided by the embodiment of the present disclosure, the transparent liquid crystal display device further comprises: a detector, configured to detect ambient light; and a controller, configured to control on and off of the ultraviolet light source according to a detection result of the detector, and the ultraviolet light source is configured to be turned on under a condition that an intensity of the ambient light is lower than a preset value, and the transparent light guide plate is configured to guide ultraviolet light emitted from the ultraviolet light source to the color resin layers, to excite the fluorescent materials to emit light, so as to assist the transparent liquid crystal display device to display under a condition that the intensity of the ambient light is lower than the preset value.

Optionally, in the transparent liquid crystal display device provided by the embodiment of the present disclosure, the transparent liquid crystal display device further comprises a cholesteric liquid crystal cell disposed on a side of the transparent backlight module opposite to the transparent display panel, a screw pitch of cholesteric liquid crystal molecule in the cholesteric liquid crystal cell and a wavelength of ultraviolet light emitted from the ultraviolet light source are in a linear relationship, and the cholesteric liquid crystal cell is configured to reflect circularly polarized ultraviolet light having an identical rotation direction with the cholesteric liquid crystal molecule in the ultraviolet light emitted from the ultraviolet light source to the color resin layers, to excite the fluorescent materials to emit light, so as to assist the transparent liquid crystal display device to display under a condition that the intensity of the ambient light is lower than the preset value.

Optionally, in the transparent liquid crystal display device provided by the embodiment of the present disclosure, the screw pitch p of the cholesteric liquid crystal molecule in the cholesteric liquid crystal cell and the wavelength $\lambda$ of the light emitted from the ultraviolet light source satisfies: $\lambda=np$, in which n indicates a mean refractive index of the cholesteric liquid crystal molecule.

Optionally, in the transparent liquid crystal display device provided by the embodiment of the present disclosure, the cholesteric liquid crystal molecules cell includes an upper substrate and a lower substrate which are cell-assembled with each other, the cholesteric liquid crystal molecule is sandwiched between the upper substrate and the lower substrate.

Optionally, in the transparent liquid crystal display device provided by the embodiment of the present disclosure, the color filter substrate also includes a water vapor blocking film disposed on a non-display side of the color resin layers.

Optionally, in the transparent liquid crystal display device provided by the embodiment of the present disclosure, the color filter substrate also includes: a base, the color resin layers being disposed on a non-display side of the base; and a built-in polarizer, disposed on a non-display side of the color resin layers.

Optionally, in the transparent liquid crystal display device provided by the embodiment of the present disclosure, the transparent liquid crystal display panel includes: an array substrate, cell-assembled with the color filter substrate; and a first polarizer, disposed on a side of the array substrate facing the transparent backlight module.

Optionally, in the transparent liquid crystal display device provided by the embodiment of the present disclosure, the color filter substrate also includes: a water vapor blocking film, disposed between the color resin layers and the built-in polarizer.

Optionally, in the transparent liquid crystal display device provided by the embodiment of the present disclosure, the transparent liquid crystal display device further comprises a frame provided with a light through hole, the detector and the controller are disposed inside the frame, the detector is disposed on an optical path of the light through hole, and the controller is connected between the ultraviolet light source and the detector.

Optionally, in the transparent liquid crystal display device provided by the embodiment of the present disclosure, wherein the transparent light guide plate is a nanometer light guide plate or a glass light guide plate.

Optionally, in the transparent liquid crystal display device provided by the embodiment of the present disclosure, the color filter substrate also includes: a base, the color resin layers being disposed on a non-display side of the base; and a second polarizer, disposed on a side of the base opposite to the color resin layers.

Optionally, in the transparent liquid crystal display device provided by the embodiment of the present disclosure, the built-in polarizer is a coating polarizer including a mixed material of dichroic dye and reactive monomer.

At a second aspect, a display method of the transparent liquid crystal display device according to the first aspect, comprises: turning on the ultraviolet light source under a condition that an intensity of the ambient light is lower than a preset value, so that light emitted by the ultraviolet light source excites the fluorescent material in the color resin layer, to emit light having an identical color with the color resin layer.

Optionally, the display method of the transparent liquid crystal display device provided by the embodiment of the present disclosure, further comprises: turning off the ultraviolet light source under a condition that an intensity of the ambient light is greater than or equal to the preset value.

Optionally, the display method of the transparent liquid crystal display device provided by the embodiment of the present disclosure, the transparent liquid crystal display device includes: a detector, configured to detect an intensity of the ambient light; and a controller, configured to control on and off of the ultraviolet light source according to a detection result of the detector; and the display method further comprises: detecting the intensity of the ambient light by utilizing the detector; providing a detection result to the controller; and comparing the detection result with the preset value by utilizing the controller; and allowing the controller to turn on the ultraviolet light source under a condition that the intensity of the ambient light is lower than the preset value.

Optionally, the display method of the transparent liquid crystal display device provided by the embodiment of the present disclosure, the turning on the ultraviolet light source under a condition that the intensity of the ambient light is lower than the preset value includes: allowing a user to manually turn on the ultraviolet light source.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMBERS

Figure 1:
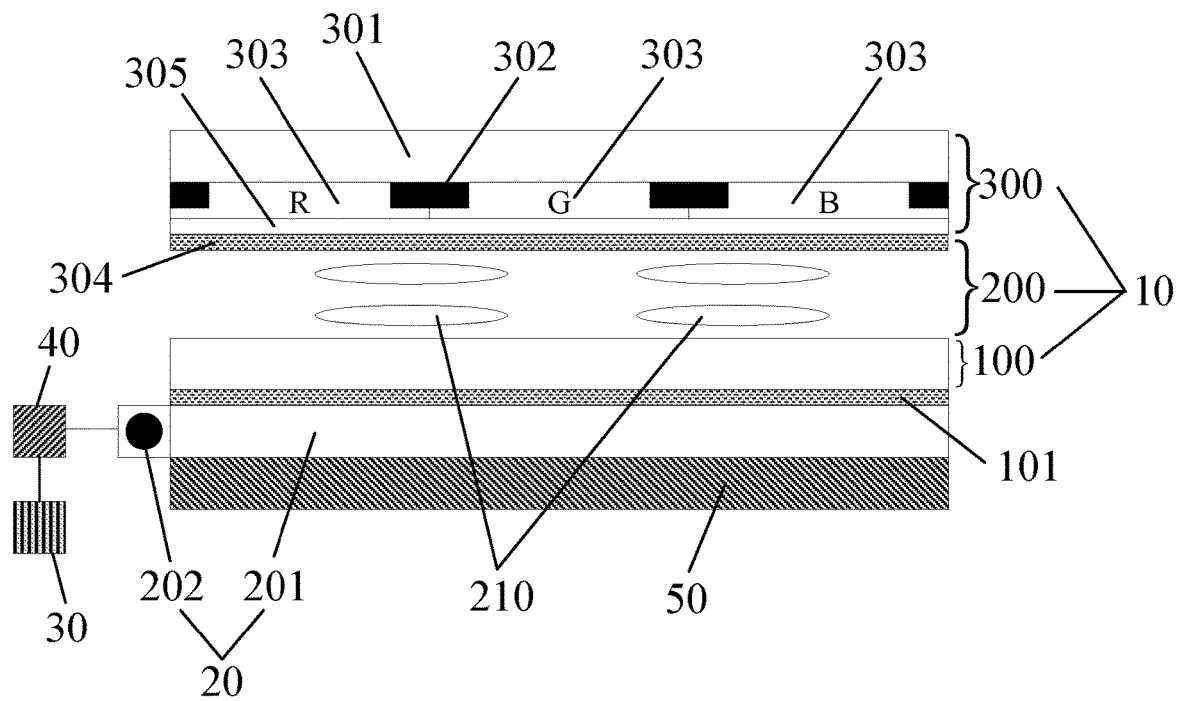
FIG. 1 is a schematic structural view of a transparent liquid crystal display device provided by the embodiment of the present disclosure.

10—transparent display panel, 20—transparent backlight module, 30—detector, 40—controller, 50—cholesteric liquid crystal cell, 100—array substrate, 200—liquid crystal layer, 300—color filter substrate, 101—first polarizer, 210—liquid crystal molecule, 301—first glass base, 302—black matrix, 303—color resin layer, 304—built—in polarizer, 305—water vapor blocking film, 201—transparent light guide plate, 202—ultraviolet light source, 501—ultraviolet light source, 502—cholesteric liquid crystal layer, 503—third glass base, 5021—cholesteric liquid crystal molecule.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

In order to improve the display effect of the transparent LCD device under weak ambient light, a visible light source may be disposed on a side end of a side of a transparent display panel away from a display region, and visible light is guided to the transparent display panel through a transparent light guide plate, thereby providing enough light for the transparent LCD panel and improving the picture brightness.

However, during transparent displaying, the transparent light guide plate will reflect the visible light on the transparent display panel, so that the transparent light guide plate will produce a high brightness reflective surface. In this way, the transparency of the transparent LCD device in the displaying process will be reduced, and then the transparent display effect of the transparent LCD device is reduced.

In order to make the foregoing objectives, characteristics and advantages of the embodiments of the present disclosure more comprehensible, further detailed description will be given below to the embodiments of the present disclosure with reference to the drawings and the specific embodiments.

A First Embodiment

The embodiment of the present disclosure provides a transparent LCD device, which comprises: a transparent LCD panel including a color filter substrate; and a transparent backlight module disposed on a non-display side of the transparent LCD panel and including: a transparent light guide plate; and an ultraviolet light source disposed on a side end of the transparent light guide plate, wherein the color filter substrate includes color resin layers with different colors, and fluorescent materials that can be excited to emit a corresponding color are respectively and correspondingly mixed in the color resin layers with different colors.

FIG. 1 is a schematic structural view of a transparent LCD device provided by the first embodiment of the present disclosure. The transparent LCD device may comprise a transparent display panel 10 and a transparent backlight module 20. As shown in FIG. 1, the transparent display panel 10 may include an array substrate 100, a liquid crystal layer 200 and a color filter substrate 300. The transparent backlight module 20 may include a transparent light guide plate 201 and an ultraviolet light source 202 disposed on a side end of the transparent light guide plate 201.

For instance, a first polarizer 101 is disposed on a side of the array substrate 100 away from the liquid crystal layer 200 and may be configured to modulate light irradiated towards the liquid crystal layer 200 into linearly polarized light.

For instance, the liquid crystal layer 200 is disposed between the array substrate 100 and the color filter substrate 300, and a liquid crystal molecule 210 in the liquid crystal layer 200 may be deflected when electrified, so the transparent display panel 10 can achieve transparent displaying through the deflection of the liquid crystal molecules 210.

The color filter substrate 300 may include a base, e.g., a first transparent base such as a first glass base 301, a black matrix 302 formed on the first glass base 301, and color resin layers 303 with different colors formed on the first glass base 301 on which the black matrix 302 is formed. Wherein, the color resin layers 303 may be arranged in columns, arranged in an array, etc. The arrangement mode of the color resin layers 303 is not specifically limited in the embodiment of the present disclosure. The color resin layers 303 of different colors, that is, the color filter layers, are disposed on the color filter substrate 300. Fluorescent materials that can emit corresponding colors are respectively and correspondingly mixed in the color resin layers 303 of different colors. Each type of fluorescent material may emit light having the same color with the color resin layer in which the fluorescent material is disposed under the excitation of the ultraviolet light.

As for a red, green and blue (RGB) transparent LCD device, the color resin layers 303 of different colors may include a plurality of R resin units, a plurality of G resin units and a plurality of B resin units, wherein a red fluorescent material is mixed in the plurality of R resin units; a green fluorescent material is mixed in the plurality of G resin units; and a blue fluorescent material is mixed in the plurality of B resin units. Thus, the red fluorescent material can emit a red light having the same color with the R resin units in which the red fluorescent material is disposed under the excitation of the ultraviolet light; the green fluorescent material can emit a green light having the same color with the G resin units in which the green fluorescent material is disposed under the excitation of the ultraviolet light; and the blue fluorescent material can emit a blue light having the same color with the B resin units in which the blue fluorescent material is disposed under the excitation of the ultraviolet light.

In one implementation manner, the color filter substrate 300 may also include a second polarizer (not shown in FIG. 1). The second polarizer may be disposed on a side of the color filter substrate 300 away from the liquid crystal layer 200 of the transparent display panel 10, namely disposed on a side of the first glass base 301 where the color resin layers 303 are not disposed.

As shown in FIG. 1, in another optional implementation manner, the color filter substrate 300 may also include a built-in polarizer 304, except that the first glass base 301, the black matrix 302 and the color resin layers 303. The built-in polarizer 304 may be disposed on a side of the base 301 facing the liquid crystal layer 200 of the transparent display panel 10, that is, the built-in polarizer 304 may be formed on outside of the color resin layers 303. In actual application, the ultraviolet light may be irradiated to the color resin layers 300 after polarization modulation, so as to excite the fluorescent materials in the color resin layers 300 to emit light. As the built-in polarizer 304 is disposed on a side of the color filter substrate 300 close to the liquid crystal layer 200, when the built-in polarizer 304 cooperates with the first polarizer 101, the polarization modulation can be realized before the light does not arrive at the color resin layers 303. As the cooperation of the built-in polarizer 304 and the first polarizer 101 can realize the complete turn-off of the light before the color resin layers 303, the fluorescent materials in the color resin layers 303 cannot receive modulated light and naturally cannot emit light with different polarization directions due to no excitation. Thus, when the light is required to be completed turned off, stray light emitted from the fluorescent materials can be prevented from being leaked out of the screen.

In addition, the color filter substrate 300 may also include a water vapor blocking film 305 which may be disposed on a side of the color resin layer 303 close to the liquid crystal layer 200 of the transparent display panel 10 and can isolate the color resin layer 300 and the fluorescent material mixed in the color resin layer 303 from external water vapor, thereby avoiding the fluorescent material in the color resin layer 303 from being eroded by the external water vapor and prolonging the luminescent lifetime of the fluorescent material.

In actual application, the built-in polarizer 304 may be a coating polarizer which includes an alignment layer and a polarizing layer. Wherein, the coating built-in polarizer 304 may be formed by curing a mixed material of dichroic dye and reactive monomer. During manufacturing the transparent LCD device, firstly, the black matrix 302 and the color resin layers 303 of different colors may be formed on the first glass base 301; then, the water vapor blocking film 305 is formed on the color resin layers 303; then, an over coat (OC) such as a polyethylene terephthalate (PET) layer is formed on the water vapor blocking film 305; then, the alignment layer may be formed on the OC by utilization of polyimide (PI), then, the mixed material of the dichroic dye and the reactive monomer may be coated on the alignment layer and cured to form the coating built-in polarizer 304. Wherein, the alignment layer in the built-in polarizer 304 may fix the alignment of reactive monomer molecules, and thus the reactive monomer molecules can drive dichroic dye molecules to form fixed alignment, so as to realize the polarization property of the built-in polarizer.

Of course, in actual application, the built-in polarizer 304 may also be a metal grating, which is not specifically limited in the embodiment of the present disclosure.

In addition, in actual application, an alignment film is respectively disposed on both sides of the liquid crystal layer 200. The two alignment films may be configured to fix the alignment of the liquid crystal molecules 210 in the liquid crystal layer 200.

The ultraviolet light source 202 may be an ultraviolet light bar in actual application and may be configured to be turned on when the ambient light is lower than a preset value, that is, being turned on when the ambient light is dark. The ultraviolet light source 202 may emit ultraviolet light when turned on. The transparent light guide plate 201 may be configured to guide the ultraviolet light emitted from the ultraviolet light source 202 to the color resin layers 303, to excite the fluorescent material to emit light, thereby assisting the transparent LCD device to display when the intensity of the ambient light is lower than the preset value. In actual application, the transparent light guide plate 201 may be a nanometer light guide plate or a glass light guide plate. As the nanometer light guide plate or the glass light guide plate has high light transmittance and low reflectivity, the transparency of the transparent LCD device can be improved.

For instance, the transparent LCD device provided by the embodiment of the present disclosure may further comprise: a detector, configured to detect ambient light; and a controller, configured to control on and off of the ultraviolet light source according to a detection result of the detector, wherein the ultraviolet light source is configured to be turned on when the intensity of the ambient light is lower than the preset value; and the transparent light guide plate is configured to guide the ultraviolet light emitted by the ultraviolet light source to the color resin layers, to excite the fluorescent material to emit light, thereby helping the transparent LCD device to display when the intensity of the ambient light is lower than the preset value.

Moreover, the transparent LCD device may further comprise a frame (not shown in FIG. 1) having a light through hole, and a detector 30 and a controller 40 disposed inside the frame. The frame may be configured to fix and shield non-transparent elements in the transparent LCD device; the transparent display panel 10 and the transparent backlight module 20 may be embedded into the frame; and the detector 30 and the controller 40 may be disposed inside the frame so as to realize reliable fixing. The detector 30 may be disposed on an optical path of the light through hole and may be configured to detect the ambient light when turned on. In actual application, the detector 30 may detect the ambient light via the light through hole. As the detector 30 is disposed in the frame surrounding the transparent display panel 10, the detector 30, for example, may accurately detect the light intensity of the ambient light on a periphery of the transparent display panel 10. For instance, the detector is an optical detector such as a photoelectric sensor, e.g., a photodiode.

The controller 40 may be connected between the ultraviolet light source 202 and the detector 30, and may be configured to control the ultraviolet light source 202 to be turned on when the intensity of the ambient light detected by the detector 30 is lower than the preset value. That is to say, when the ambient light on the periphery of the transparent LCD device is dark, the controller 40 may control the ultraviolet light source 202 to be turned on. After the ultraviolet light source 202 is turned on, the transparent light guide plate 201 may guide the ultraviolet light emitted by the ultraviolet light source 202 to the color resin layers 303, to excite the fluorescent material to emit light, thereby supplementing light required by displaying for the transparent LCD device. As the ultraviolet light is invisible, the transparent light guide plate in the transparent LCD device will not produce a high-brightness reflective surface, thereby improving the transparency of the transparent LCD device during transparent displaying.

In addition, the controller 40 may also be configured to control the ultraviolet light source 202 to be turned off when the intensity of the ambient light detected by the detector 30 is greater than or equal to the preset value. That is to say, when the ambient light on the periphery of the transparent LCD device is bright, the controller 40 may control the ultraviolet light source 202 to be turned off, so the transparent LCD device can perform displaying only through the ambient light. As the ultraviolet light source 202 is not required to be turned on when the ambient light is bright, the power consumption of the transparent LCD device can be reduced.

Of course, in actual application, on state of the ultraviolet light source 202 may also be manually controlled by a user. That is to say, when the user thinks that the ambient light is insufficient, the user may manually turn on the ultraviolet light source 202, so as to improve the picture brightness during transparent displaying. No specific limitation will be given here in the embodiment of the present disclosure.

For instance, the user may determine whether to turn on or off the ultraviolet light source depending on his own feeling. When the user cannot clearly view the content displayed by the transparent LCD device as the ambient light is dark, the user may manually turn on the ultraviolet light source. Or the user may manually turn on or off the ultraviolet light source according to the light intensity of the ambient light detected by the detector. The detection result of the detector may be displayed on a screen or displayed on a corresponding application and then provided to the user. No limitation will be given here in the embodiment of the present disclosure.

Figure 2:
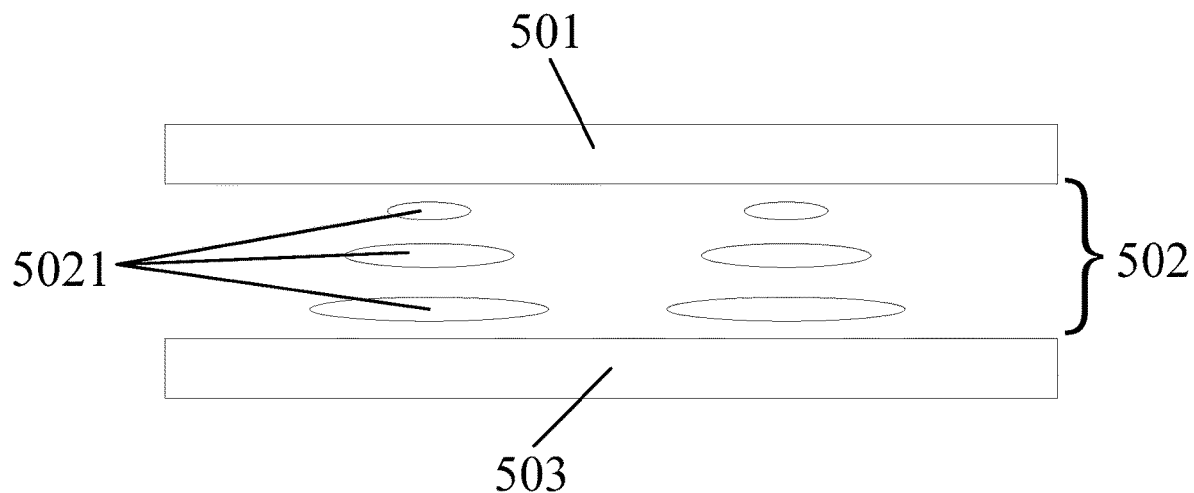
FIG. 2 is a schematic structural view of a cholesteric liquid crystal cell in the embodiment of the present disclosure.

Moreover, the transparent LCD device may further comprise a cholesteric liquid crystal cell 50. As shown in FIG. 1, the cholesteric liquid crystal cell may be disposed on outside of the transparent backlight module 20, namely disposed on a side of the transparent light guide plate 201 away from the liquid crystal layer 200. FIG. 2 is a schematic structural view of the cholesteric liquid crystal cell 50. As shown in FIG. 2, the cholesteric liquid crystal cell 50 may include a second transparent base, for example, a second glass base 501, a cholesteric liquid crystal layer 502, and a third transparent base, for example, a third glass base 503, wherein the cholesteric liquid crystal layer 502 is disposed between the second glass base 501 and the third glass base 503, and the second glass base 501 of the cholesteric liquid crystal cell 50 may be bonded to the transparent light guide plate 201 in the transparent backlight module 20. The cholesteric liquid crystal layer 502 includes cholesteric liquid crystal molecules 5021. The arrangement direction of the cholesteric liquid crystal molecules 5021 may be adjusted by using means such as the addition of chiral material or optical excitation, so that the screw pitch of the cholesteric liquid crystal molecules can be adjusted. Electrical filed control is not required to be performed on the second glass base 501 and the third glass base 503.

Wherein, the screw pitch of the cholesteric liquid crystal in the cholesteric liquid crystal cell 50 and a wavelength of the ultraviolet light source 202 are in linear relationship. More specifically, the screw pitch of the cholesteric liquid crystal and the wavelength of the ultraviolet light source 202 may satisfy the following linear relationship (1):

$$\lambda=np \qquad (1)$$

wherein λ indicates the wavelength of the ultraviolet light source 202; n refers to a mean refractive index of the cholesteric liquid crystal molecules; and p denotes the screw pitch of the cholesteric liquid crystal.

The cholesteric liquid crystal cell 50 may be configured to reflect circularly polarized ultraviolet light having the same rotation direction with the cholesteric liquid crystal in the ultraviolet light emitted by the ultraviolet light source 202 to the color resin layers 303, to excite the fluorescent material to emit light, thereby assisting the transparent LCD device to display when the intensity of the ambient light is lower than the preset value.

In actual application, when the transparent light guide plate 201 guides the ultraviolet light to the transparent display panel 10, a portion of the ultraviolet light will be irradiated towards outside of the transparent backlight module 20 due to the reasons such as element refraction and reflection, and the cholesteric liquid crystal cell 50 disposed on outside of the transparent backlight module 20 can reflect the circularly polarized ultraviolet light having the same rotation direction with the cholesteric liquid crystal, in the ultraviolet light due to its own optical property, so as to reflect the circularly polarized ultraviolet light to the transparent display panel 10, and then the reflected circularly polarized ultraviolet light can excite the fluorescent material to emit light when arriving at the color resin layers. For instance, when the rotation direction of the cholesteric liquid crystal is right-handed rotation, the cholesteric liquid crystal layer 502 can reflect the right-handed circularly polarized ultraviolet light. As the cholesteric liquid crystal cell can reflect a portion of the ultraviolet light to the color resin layers to excite the fluorescent material to emit light, the utilization rate of the ultraviolet light can be improved, thereby further improving the picture brightness of the transparent LCD device during transparent displaying.

In addition, due to the optical property of the cholesteric liquid crystal, when the cholesteric liquid crystal cell 50 reflects the circularly polarized ultraviolet light, as the screw pitch of the cholesteric liquid crystal and the wavelength of visible light in the ambient light does not satisfy the above linear relationship (1), the visible light in the ambient light may be transmitted through the cholesteric liquid crystal cell 50 and arrive at the transparent display panel 10 and will not be reflected by the cholesteric liquid crystal cell 50. Therefore, the cholesteric liquid crystal cell 50 not only can improve the utilization rate of the ultraviolet light but also can ensure the utilization rate of the visible light in the ambient light.

An alignment film may be respectively disposed on both sides of the cholesteric liquid crystal layer 502. The two alignment films may be configured to fix the alignment of the cholesteric liquid crystal molecules 5021 in the cholesteric liquid crystal layer 502. In the embodiment of the present disclosure, the two alignment films disposed on both sides of the cholesteric liquid crystal layer 502 may adopt along surface frictionless alignment, so the cholesteric liquid crystal molecules 5021 may be arranged irregularly along surface.

In addition, compared with a transparent LCD device supplemented light by a show window, namely a show window provided with an additional light source is arranged behind the transparent LCD device, in the transparent LCD device provided by the embodiment of the present disclosure, the fluorescent material in the color resin layers can be excited to emit light by the ultraviolet light source, thereby helping the transparent LCD device to display when the ambient light is dark. Thus, the transparent LCD device can get rid of the display mode of the light supplementing window.

In actual application, the transparent display panel 10 may be any one of a twisted nematic (TN) transparent display panel, an advanced super dimension switch (ADS) transparent display panel, and a vertical alignment (VA) transparent display panel. No specific limitation will be given here in the embodiment of the present disclosure.

In the transparent LCD device provided by the embodiment of the present disclosure, the color resin layers of different colors on the color filter substrate are respectively and correspondingly mixed with the fluorescent materials that can be excited to emit colors of the color resin layers in which the fluorescent material is disposed; and each fluorescent material may emit the light having the same color with the color resin layer in which the fluorescent material is disposed under the excitation of the ultraviolet light. Thus, when the ambient light is dark and the ultraviolet light provided by the backlight module may be adopted to irradiate the fluorescent material, the light excited by the fluorescent material supplements the insufficiency of the ambient light, so as to improve the picture brightness during transparent displaying. Meanwhile, as the ultraviolet light is invisible, the light guide plate in the transparent LCD device will not produce a high-brightness reflective surface, thereby improving the transparency of the transparent LCD device during transparent displaying while improving the picture brightness. In addition, the cholesteric liquid crystal cell disposed on outside of the transparent backlight module may reflect a portion of the ultraviolet light not irradiated to the transparent display panel to the transparent display panel, so as to excite the fluorescent material in the color resin layer to emit light, thereby improving the utilization rate of the ultraviolet light and further improving the picture brightness during transparent displaying.

The embodiment of the present disclosure further provides a display method of any foregoing transparent LCD device, which comprises: turning on the ultraviolet light source under a condition that the intensity of the ambient light is lower than a preset value, so that the light emitted by the ultraviolet light source excites the fluorescent material in the color resin layer, to emit light having the same color with the color resin layer in which the fluorescent material is disposed.

For instance, the display method of the transparent LCD device further comprises: turning off the ultraviolet light source when the intensity of the ambient light is greater than or equal to the preset value.

For instance, in the display method of the transparent LCD device, the transparent LCD device further comprises: a detector, configured to detect the intensity of the ambient light; and a controller, configured to control on and off of the ultraviolet light source according to a detection result of the detector. The display method further comprises: detecting an intensity of the ambient light by utilizing the detector; providing a detection result to the controller; comparing the detection result and a preset value by utilizing the controller, and turning on the ultraviolet light source by the controller when the intensity of the ambient light is lower than the preset value.

For instance, in the display method of the transparent LCD device, the turning on the ultraviolet light source when the intensity of the ambient light is lower than the preset value includes: allowing a user to manually turn on the ultraviolet light source.

Compared with the prior art, the embodiment of the present disclosure has the following advantages:

In the transparent LCD device and the display method thereof provided by the embodiment of the present disclosure, the color resin layers of different colors on the color filter substrate are respectively and correspondingly mixed with the fluorescent materials that can emit corresponding colors of the color resin layers, and each kind of the fluorescent material may emit light having the same color with the color resin layer in which the fluorescent material is disposed under the excitation of the ultraviolet light. Thus, when the ambient light is dark and the ultraviolet light provided by the backlight module may be adopted to irradiate the fluorescent material, the light excited by the fluorescent material supplements the insufficiency of the ambient light, so as to improve the picture brightness during transparent displaying. Meanwhile, as the ultraviolet light is invisible, the transparent light guide plate in the transparent LCD device will not produce a high-brightness reflective surface, thereby improving the transparency of the transparent LCD device during transparent displaying while improving the brightness of the picture.

Each embodiment of the present disclosure is described in a progressive manner, what each embodiment emphatically explains is difference with other embodiments, the similar portion or the same portion between different embodiments may be referred to each other.

Finally, it needs to be noted that the relationship terms, such as "first," "second," or the like, which are used in the description and the claims of the present disclosure, are not intended to require or imply any such practical relationship or order which exists between these entities and operations, only are used to distinguish one entity or operation with another entity or operation. Further, the terms, such as "comprise/comprising," "include/including," or the like are intended to cover non-exclusive inclusion, so that the process, method, a commodity or an equipment including a series of elements not only includes those elements but also includes other elements which is listed clearly, or also includes the inherent element of the process, the method, the commodity or the equipment. In the absence of more restrictions, an element defined by a term "including a" does not exclude the other same elements in the process, the method, the commodity or the equipment which includes the element.

A transparent liquid crystal display device provided by the disclosed embodiments is explained in detail. The principle and implementation modes of an embodiment of the present disclosure are described in specific examples. The description of the above embodiments is only used to help understand the methods and a core principle of an embodiment of the present disclosure. At the same time, for the ordinary those skilled in the art, according to the idea of the present disclosure, there will be changes in the specific mode of implementation and scope of application. In summary, the contents of the specification shall not be understood as restrictions on the embodiment of the present disclosure.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged or reduces, that is, the accompanying drawings are not drawn according to the actual scale. However, it should understood that, in the case in which a component or element such as a layer, film, region, substrate or the like is referred to be "on" or "under" another component or element, it may be directly on or under the another component or element or a component or element is interposed therebetween.

(3) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The application claims priority to the Chinese patent application No. 201810487662.4, filed May 21, 2018, the disclosure of which is incorporated herein by reference as part of the application.

The invention claimed is:

1. A transparent liquid crystal display device, comprising:
a transparent liquid crystal display panel, including a color filter substrate;
a transparent backlight module, disposed on a non-display side of the transparent liquid crystal display panel and including:
a transparent light guide plate; and
an ultraviolet light source, disposed on a side end of the transparent light guide plate;
a detector, configured to detect ambient light; and
a controller, configured to control on and off of the ultraviolet light source according to a detection result of the detector,
wherein the color filter substrate includes color resin layers with different colors, and the color resin layers with the different colors are mixed with fluorescent materials which are excitable to emit corresponding colors,
wherein the ultraviolet light source is configured to be turned on under a condition that an intensity of the ambient light is lower than a preset value, and the transparent light guide plate is configured to guide ultraviolet light emitted from the ultraviolet light source to the color resin layers, to excite the fluorescent materials to emit light, so as to assist the transparent liquid crystal display device to display under a condition that the intensity of the ambient light is lower than the preset value.

2. The transparent liquid crystal display device according to claim 1, further comprising:
a cholesteric liquid crystal cell, disposed on a side of the transparent backlight module opposite to the transparent liquid crystal display panel, wherein a screw pitch of a cholesteric liquid crystal molecule in the cholesteric liquid crystal cell and a wavelength of ultraviolet light emitted from the ultraviolet light source are in a linear relationship, and
the cholesteric liquid crystal cell is configured to reflect circularly polarized ultraviolet light having an identical rotation direction with the cholesteric liquid crystal molecule in the ultraviolet light emitted from the ultraviolet light source to the color resin layers, to excite the fluorescent materials to emit the light, so as to assist the transparent liquid crystal display device to display under the condition that the intensity of the ambient light is lower than the preset value.

3. The transparent liquid crystal display device according to claim 2, wherein the screw pitch p of the cholesteric liquid crystal molecule in the cholesteric liquid crystal cell and the wavelength $\lambda$ of the light emitted from the ultraviolet light source satisfies: $\lambda=np$, in which n indicates a mean refractive index of the cholesteric liquid crystal molecule.

4. The transparent liquid crystal display device according to claim 3, wherein the cholesteric liquid crystal cell includes:
an upper substrate and a lower substrate which are cell-assembled with each other,
wherein the cholesteric liquid crystal molecule is sandwiched between the upper substrate and the lower substrate.

5. The transparent liquid crystal display device according to claim 1, wherein the color filter substrate also includes:
a water vapor blocking film, disposed on a non-display side of the color resin layers.

6. The transparent liquid crystal display device according to claim 1, wherein the color filter substrate also includes:

a base, the color resin layers being disposed on a non-display side of the base; and a built-in polarizer, disposed on a non-display side of the color resin layers.

7. The transparent liquid crystal display device according to claim 6, wherein the transparent liquid crystal display panel includes:

an array substrate, cell-assembled with the color filter substrate; and a first polarizer, disposed on a side of the array substrate facing the transparent backlight module.

8. The transparent liquid crystal display device according to claim 7, wherein the color filter substrate also includes:

a water vapor blocking film, disposed between the color resin layers and the built-in polarizer.

9. The transparent liquid crystal display device according to claim 1, wherein the transparent liquid crystal display device further comprises a frame provided with a light through hole, the detector and the controller are disposed inside the frame, the detector is disposed on an optical path of the light through hole, and the controller is connected between the ultraviolet light source and the detector.

10. The transparent liquid crystal display device according to claim 1, wherein the transparent light guide plate is a nanometer light guide plate or a glass light guide plate.

11. The transparent liquid crystal display device according to claim 1, wherein the color filter substrate also includes:

a base, the color resin layers being disposed on a non-display side of the base; and a second polarizer, disposed on a side of the base opposite to the color resin layers.

12. The transparent liquid crystal display device according to claim 6, wherein the built-in polarizer is a coating polarizer including a mixed material of a dichroic dye and a reactive monomer.

13. A display method of the transparent liquid crystal display device according to claim 1, comprising:

turning on the ultraviolet light source under the condition that the intensity of the ambient light is lower than the preset value, so that the ultraviolet light emitted from the ultraviolet light source excites the fluorescent materials in the color resin layers, to emit light having identical colors with the color resin layers.

14. The display method of the transparent liquid crystal display device according to claim 13, further comprising:

turning off the ultraviolet light source under a condition that the intensity of the ambient light is greater than or equal to the preset value.

15. The display method of the transparent liquid crystal display device according to claim 13, further comprising detecting the intensity of the ambient light by utilizing the detector;

providing the detection result to the controller;

comparing the detection result with the preset value by utilizing the controller; and allowing the controller to turn on the ultraviolet light source under the condition that the intensity of the ambient light is lower than the preset value.

16. The display method of the transparent liquid crystal display device according to claim 14, wherein the turning on the ultraviolet light source under the condition that the intensity of the ambient light is lower than the preset value includes:

allowing a user to manually turn on the ultraviolet light source.

17. A transparent liquid crystal display device, comprising:

a transparent liquid crystal display panel, including a color filter substrate;

a transparent backlight module, disposed on a non-display side of the transparent liquid crystal display panel and including:

a transparent light guide plate; and an ultraviolet light source, disposed on a side end of the transparent light guide plate, a cholesteric liquid crystal cell, disposed on a side of the transparent backlight module opposite to the transparent liquid crystal display panel, wherein a screw pitch of a cholesteric liquid crystal molecule in the cholesteric liquid crystal cell and a wavelength of ultraviolet light emitted from the ultraviolet light source are in a linear relationship, wherein the color filter substrate includes color resin layers with different colors, and the color resin layers with the different colors are mixed with fluorescent materials which are excitable to emit corresponding colors, and wherein the cholesteric liquid crystal cell is configured to reflect circularly polarized ultraviolet light having an identical rotation direction with the cholesteric liquid crystal molecule in the ultraviolet light emitted from the ultraviolet light source to the color resin layers, to excite the fluorescent materials to emit light, so as to assist the transparent liquid crystal display device to display under a condition that an intensity of ambient light is lower than a preset value.

18. The transparent liquid crystal display device according to claim 17, wherein the screw pitch p of the cholesteric liquid crystal molecule in the cholesteric liquid crystal cell and the wavelength $\lambda$ of the light emitted from the ultraviolet light source satisfies: $\lambda=np$, in which n indicates a mean refractive index of the cholesteric liquid crystal molecule.

19. The transparent liquid crystal display device according to claim 18, wherein the cholesteric liquid crystal cell includes:

an upper substrate and a lower substrate which are cell-assembled with each other, wherein the cholesteric liquid crystal molecule is sandwiched between the upper substrate and the lower substrate.

* * * * *